W. R. SMITH.
APPARATUS FOR TREATING METALLIC ORES.
APPLICATION FILED FEB. 18, 1914.
1,249,226.
Patented Dec. 4, 1917.
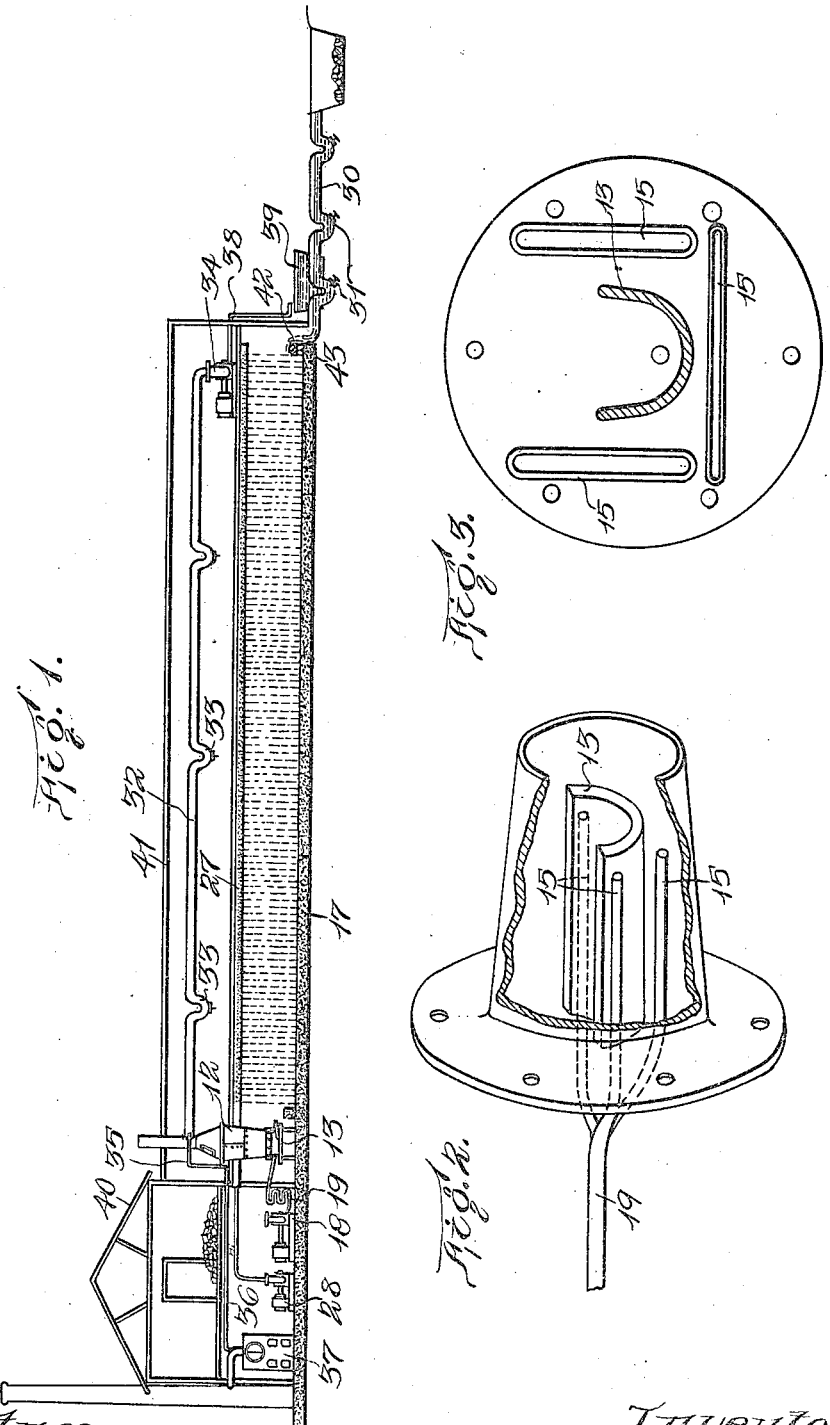

UNITED STATES PATENT OFFICE.

WILLIAM R. SMITH, OF BUFFALO, NEW YORK.

APPARATUS FOR TREATING METALLIC ORES.

1,249,226.     Specification of Letters Patent.     Patented Dec. 4, 1917.

Application filed February 18, 1914. Serial No. 819,467.

*To all whom it may concern:*

Be it known that I, WILLIAM R. SMITH, a citizen of the United States, and resident of Buffalo, in the county of Erie and State of New York, have invented certain new and useful Improvements in Apparatus for Treating Metallic Ores, of which the following is a specification.

This invention relates to the treatment of metallic ores and especially those containing arsenic such as cobaltite.

The object of the invention is to condense and collect the arsenic which usually escapes in gaseous form from a blast furnace in which such ores are smelted, to the great injury of the surrounding country.

The invention consists in the improvements in ore treating apparatus which I will now proceed to describe and claim.

Of the accompanying drawings forming a part of this specification:

Figure 1 represents somewhat diagrammatically an apparatus embodying my invention;

Fig. 2 represents a perspective view of the blast furnace outlet and an arrangement of twyers associated therewith for projecting a stream of molten metal from the outlet;

Fig. 3 represents an end view of the furnace outlet, showing differently formed twyers.

The same reference characters indicate the same or similar parts in all the views.

In the drawings 12 represents a blast furnace, which may be of any suitable construction and provided with the usual twyers for directing blasts of air into the lower portion of the furnace. I do not show the general construction of the furnace including the usual twyers, these being well known. 13 represents the outlet of the furnace through which the molten metal may flow from the lower portion thereof. As here shown, the outlet is extended in the form of a trough from one side of the lower portion of the furnace.

The stream of molten metal from the outlet may be discharged upon a bed 17, and may or may not be projected by superheated steam or air under pressure directed through a series of nozzles or twyers 15, three of which are here shown, one located below and two on opposite sides of the outlet. As shown by Fig. 2 the twyers 15 are circular in cross section, while in Fig. 3 they are shown as flattened. 18 represents an air pump or forcing apparatus, the outlet 19 of which communicates with the twyers 15.

Water may be discharged upon the metal by a water conduit 27 arranged horizontally over bed 17, said conduit being supplied with water by a pump 28 and being provided with numerous small perforations which distribute the water in fine streams and direct it downwardly upon the metal.

The water thus distributed absorbs gaseous arsenic escaping from the molten metal. The water, after absorbing the arsenic, accumulates on the bed 17 and passes thence through an outlet conduit 30, which may be provided with traps or collectors 31 to arrest gold and other metals carried by the water.

32 represents a horizontal gas conduit connected with the upper portion of the furnace 12 and having traps 33 or other suitable means for collecting arsenic. An exhaust fan 34 or other means for drawing gases through the conduit 32 is connected with the outer end of the conduit. Water is introduced into the inner end of the gas conduit 32 by means of a pipe 35 connected with the pump 28, the water acting to absorb the arsenic and being accumulated in the traps 33 from which it may be removed from time to time. A steam pipe 36 from a boiler 37 may communicate with the pipe 35 so that steam and water may be admitted simultaneously to the gas conduit 32. Any water which passes through the gas conduit may be discharged through a pipe 38 into a pan or reservoir 39.

The apparatus is inclosed in a suitable building, which may include a main building 40 containing the boiler 37 and the pumps 18 and 28, and a suitable annex 41 covering the space over the bed 17 which constitutes the floor of said annex.

I prefer to provide means for accumulating a body of water on the floor 17, the hot materials deposited on the floor being disintegrated or crumbled by falling into the accumulated and relatively cold water. A dam 42 may be provided at the outer end of the floor to impound a part of the water discharged from the conduit 27, and said dam may have an outlet closed by a removable plug 43.

The described apparatus may be utilized for removing sulfur and other impurities from the metals.

Having described my invention, I claim:

1. An apparatus of the character described comprising a blast furnace, a pipe connected to receive gases from said furnace, means for introducing a stream of water into said pipe at a point contiguous to said furnace, and means for drawing the gases from the furnace through the pipe, said pipe having means for collecting particles precipitated in the pipe during passage of the fumes therethrough.

2. An apparatus of the character stated comprising a blast furnace, a pipe connected to receive gases from said furnace, means for introducing a stream of water into said pipe at a point contiguous to said furnace, an exhaust fan at the discharge end of said pipe, said pipe having traps for collecting particles precipitated therein during the passage of fumes therethrough, and a water discharge conduit leading from the discharge end of said pipe.

3. An apparatus of the character stated, comprising a blast furnace having means for discharging its contents in a stream, a bed arranged to receive the molten metal from the lower portion of the furnace, an inclosing structure of which the said bed forms the floor, and means for introducing water into said structure to absorb gaseous arsenic emanating from the metal discharged therein, an outlet being provided to conduit the water from said structure.

In testimony whereof I have affixed my signature, in presence of two witnesses.

WILLIAM R. SMITH.

Witnesses:
LEONARD W. SMITH,
HENRY P. BRUNNER.

Copies of this patent may be obtained for five cents each, by addressing the "Commissioner of Patents, Washington, D. C."